United States Patent
Amonou et al.

(10) Patent No.: US 6,333,705 B1
(45) Date of Patent: Dec. 25, 2001

(54) METHODS AND DEVICES FOR CODING AND DECODING DIGITAL SIGNALS, AND SYSTEMS USING THEM

(75) Inventors: Isabelle Amonou, Thorigne-Fouillard; Félix Henry, Rennes, both of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,189

(22) Filed: Apr. 7, 2000

(30) Foreign Application Priority Data

Apr. 8, 1999 (FR) .................................................. 99 04401

(51) Int. Cl.$^7$ ...................................................... H03M 7/46
(52) U.S. Cl. ............................................... 341/107; 341/51
(58) Field of Search .............................. 341/51, 107, 65, 341/67

(56) References Cited

U.S. PATENT DOCUMENTS 6,144,320 * 11/2000 Van Der Vleuten .................. 341/107
6,252,992 * 6/2001 Ishikawa .............................. 341/107

FOREIGN PATENT DOCUMENTS

| 0 417 739 A2 | 3/1991 | (EP) . |
| 0 417 739 A3 | 3/1991 | (EP) . |
| 0 899 960 A2 | 3/1999 | (EP) . |
| 0 899 960 A3 | 3/1999 | (EP) . |

OTHER PUBLICATIONS

R. Rinaldo et al., "Image Coding By Block Prediction Of Multiresolution Subimages", IEEE Trans. Image Proc., Jul. 1995, pp. 909–920 (numbered 1–23 in attached copy).

* cited by examiner

*Primary Examiner*—Brian Young
(74) *Attorney, Agent, or Firm*—Fitzpatrick, Cella, Harper & Scinto

(57) ABSTRACT

In order to code a digital signal, it is decomposed (20) into several subsignals; each subsignal is coded (38) by means of a coding technique taken from amongst M coding techniques Ci; and the stream of coded bits thus produced is entered (40) in a first part of a file intended to receive the coded digital signal. Then the application, successively to each coded subsignal, of each decoding technique Di associated with the coding technique Ci is simulated (48); and if and only if at least two different decoding techniques are acceptable, within the meaning of a predetermined likelihood criterion, for decoding the same coded subsignal, there is entered (52) in a second part of the file information making it possible to select, during decoding, the decoding technique associated with the coding technique used for coding this subsignal.

38 Claims, 5 Drawing Sheets

METHODS AND DEVICES FOR CODING AND DECODING DIGITAL SIGNALS, AND SYSTEMS USING THEM

The present invention relates to a method and device for coding digital signals, to a method and device for decoding these same digital signals, and to systems using them.

The digital signals in question can be images, video signals, sound signals or data. Here the invention will be described here more particularly in its application to digital signals representing images.

In the field of digital signal coding, it is sometimes advantageous to use several coding techniques for coding the same set of data. In such case, by virtue of a selection method, based for example on an optimum transmission rate allocation criterion, the best coding technique is chosen and applied locally.

For the decoder to be able to correctly decode the coded signals which it receives, an item of information referred to as a "flag" is, conventionally, generally transmitted, making it possible to know which coding technique has been used on each signal portion.

Thus, for example, in accordance with the prior art, a digital image can be divided into blocks, and, for coding each block, it is possible to have a choice between coding by vector quantisation and coding by discrete cosine transform (DCT). Each block is coded by the most appropriate method within the terms of a criterion fixed a priori, and a flag is transmitted with the image signal, in order to indicate, for each block, whether vector quantisation or DCT has been used.

The flag is for example a word able to take as many different values as there are different coding techniques used for coding the blocks.

This way of proceeding according to the prior art notably has the drawback of requiring the transmission of a large number of flags, namely as many flags as there are coded blocks, and therefore reducing the degree of compression of the signals, which consequently limits the transmission rate.

The aim of the present invention is to remedy the aforementioned drawbacks, by eliminating the need to transmit, routinely and explicitly, additional information indicating the coding technique used, in order to arrive at a better compromise between the compression and distortion rates of the signals.

To this end, the present invention proposes a method of coding a digital signal comprising steps of:
dividing the signal into a plurality of subsignals,
choosing a coding technique to code the subsignals among a plurality of coding techniques, so as to produce a stream of coded subsignals,
checking if the decoding of coded subsignals by at least two different decoding techniques associated to the coding techniques is acceptable, and
if at least the decoding of one coded subsignal by at least two different techniques is acceptable, inserting an item of information in the stream of coded subsignals making it possible to select, during decoding, a decoding technique associated with the coding technique used for coding said subsignal.

Thus the coding method takes place in two main phases, including a coding phase proper and a decoding simulation phase, during which there is added, not routinely but only in certain cases, an item of information relating to the coding method used, which makes it possible to reduce the quantity of information produced during coding and therefore to improve the compression rate of the signal.

As a variant, the decoding simulation phase could be omitted, which would make it possible to make the coding and decoding faster, at the risk of obtaining a decoding of lower quality.

According to a particular characteristic, the digital signal is divided into a plurality of frequency sub-bands, themselves divided into blocks constituting the aforementioned subsignals, these subsignals corresponding respectively to the aforementioned plurality of frequency sub-bands.

According to a particular characteristic, in the checking step, a likelihood criterion is used for checking if the decoding of coded subsignals by at least two different decoding techniques associated to the coding techniques is acceptable.

In a particular embodiment, the likelihood criterion consists of:
comparing the value of the distortion between a decoded digital subsignal and adjacent subsignals with a predetermined threshold, and
deciding that the decoded signal is likely if the value of the distortion is less than or equal to this threshold, and
deciding that the decoded subsignal is not likely if the value of the distortion is strictly greater than this threshold.

Such a likelihood criterion makes it possible effectively and simply to eliminate the inappropriate decoding techniques, which result in very high distortion values, reflecting the fact that the decoding technique tested does not correspond to the coding technique used at the start.

In a particular embodiment, in which the digital signal is an image signal and each subsignal is a block of coefficients, the value of the distortion is calculated from the root mean square error between two vectors of coefficients situated along the boundary of one or more blocks.

In this case, a threshold making it possible to decide on the likelihood of the decoded signal can be chosen for example as a function of the nature of the images.

For the same purpose as before, the present invention also proposes a digital signal coding apparatus, comprising:
dividing means for dividing the signal into a plurality of subsignals,
choosing means for choosing a coding technique to code subsignals among a plurality of coding techniques, so as to produce a stream of coded subsignals,
checking means for checking if the decoding of coded subsignals by at least two different decoding techniques associated to the coding techniques is acceptable, and
if at least the decoding of one coded subsignal by at least two different techniques is acceptable, inserting means for inserting an item of information in the stream of coded subsignals making if possible to select, during decoding, a decoding technique associated with a coding technique used for coding said subsignal.

According to a particular characteristic, the dividing means for dividing the digital signal include means for dividing the digital signal into a plurality of frequency sub-bands, themselves divided into blocks constituting said subsignals corresponding respectively to said plurality of frequency sub-bands.

According to a particular characteristic, said checking means checks if the decoding of coded subsignals by at least two different decoding techniques associated to the coding techniques is acceptable by using a likelihood criterion.

According to a particular characteristic, the likelihood criterion consists of:
comparing the value of the distortion between a decoded digital signal and adjacent subsignals with a predetermined threshold, and deciding that the decoded subsignal is likely if the value of the distortion is less than or equal to said threshold, or deciding that the decoded subsignal is not likely if the value of the distortion is strictly greater than said threshold.

In a particular embodiment, in which the digital signal is an image and each subsignal is a block of coefficients, the value of the distortion is calculated from the root mean square error between two vectors of coefficients located along the boundary of one or more blocks.

The present invention also proposes a method of decoding a coded digital signal, this coded signal resulting from an original digital signal decomposed into a plurality of subsignals, each subsignal being coded by means of a coding technique among a plurality of coding techniques, the method comprising the steps of:

applying a plurality of decoding techniques to at least one coded subsignal, and if at least two decoding techniques are acceptable for at least one coded subsignal, reading in the stream of coded subsignals an item of information making it possible to select a decoding technique among the decoding techniques.

According to a particular characteristic, the decoding method further comprises a checking step for checking if at least two decoding techniques are acceptable for at least one coded subsignal, and wherein in the checking step a likelihood criterion is used.

According to a particular characteristic, the likelihood criterion consists of:

comparing the value of the distortion between a decoded digital signal and adjacent subsignals with a predetermined threshold, and deciding that the decoded subsignal is likely if the value of the distortion is less than or equal to said threshold, or deciding that the decoded subsignal is not likely if the value of the distortion is strictly greater than said threshold.

In a particular embodiment, in which the digital signal is an image and each subsignal is a block of coefficients, the value of the distortion is calculated from the root mean square error between two vectors of coefficients located along the boundary of one or more blocks.

The present invention also proposes an apparatus for decoding a coded digital signal, this coded signal resulting from an original digital signal decomposed into a plurality of subsignals, at least one subsignal being coded by means of a coding technique among a plurality of coding techniques, the apparatus comprising:

applying means for applying a plurality of decoding techniques to at least one coded subsignal, and reading means for reading in the stream of coded subsignals an item of information making it possible to select a decoding technique among decoding techniques if at least two decoding techniques are acceptable for at least one coded subsignal.

According to a particular characteristic, the decoding apparatus further comprises checking means for checking if at least two decoding techniques are acceptable for at least one coded subsignal, and said checking means checks within the meaning of a likelihood criterion.

According to a particular characteristic, the likelihood criterion consists of:

comparing the value of the distortion between a decoded digital signal and adjacent subsignals with a predetermined threshold, and deciding that the decoded subsignal is likely if the value of the distortion is less than or equal to said threshold, or deciding that the decoded subsignal is not likely if the value of the distortion is strictly greater than said threshold.

In a particular embodiment, in which the digital signal is an image and each subsignal is a block of coefficients, the value of the distortion is calculated from the root mean square error between two vectors of coefficients located along the boundary of one or more blocks.

The invention also proposes a method of coding a digital signal divided into a plurality of subsignals comprising the steps of:

coding subsignals so as to produce a stream of coded subsignals, and for at least one coded subsignal, if the coded subsignal can be decoded within the meaning of a predetermined likelihood criterion, setting a predetermined value on an item of information for the coded subsignal an indexing the coded subsignals by the items of informations for the coded subsignals.

According to a particular characteristic, the coding method further comprises a step of checking if subsignals can be decoded within the meaning of a predetermined likelihood criterion.

According to a particular characteristic, the checking step includes a step of decoding subsignals.

According to a particular characteristic, the checking step includes a step for checking a dynamic range of the decoded subsignals.

According to a particular characteristic, the checking step includes a step for checking a value of distortion between adjacent subsignals.

According to a particular characteristic, the indexing is executed for each of the coded digital data corresponding to the subsignal.

The invention also proposes a method of decoding a stream comprising coded subsignals and items of informations, the method comprising the steps of:

reading items of informations relating to the decoding from the stream, the items of informations being set within the meaning of a predetermined likelihood criterion, and decoding subsignals according to the items of informations read in said reading step.

According to a particular characteristic, the likelihood criterion relates to distortion between adjacent subsignals.

The invention also proposes a method of coding a digital signal divided into a plurality of subsignals comprising the steps of:

coding subsignals so as to produce a stream of coded subsignals; and if at least the decoding of one coded subsignal by at least two different techniques is acceptable, indexing said coded subsignal by an item of information.

The invention also proposes a method of decoding a coded digital signal, the coded signal resulting from an original digital signal decomposed into a plurality of subsignals, the subsignals being coded by means of a coding technique among a plurality of coding techniques, the method comprising the steps of:

applying a plurality of decoding techniques to a coded subsignal, and if at least two decoding techniques are acceptable, reading an item of information making it possible to select a decoding technique among decoding techniques from the stream of coded signals.

The invention also proposes an apparatus for coding a digital signal divided into a plurality of subsignals comprising:

coding means for coding subsignals so as to produce a stream of coded subsignals; and indexing means for setting to a predetermined value an item of information for a coded subsignal if the coded subsignal can be decoded within the meaning of a predetermined likelihood criterion and for indexing the coded subsignals by the items of informations for the coded subsignals.

The invention also proposes an apparatus for decoding a stream comprising coded subsignals and items of informations comprising:

reading means for reading items of informations relating to the decoding from the stream of coded subsignals, the items being set within the meaning of a predetermined likelihood criterion; and decoding means for decoding subsignals according to items of informations read by said reading means.

The invention also proposes an apparatus for coding a digital signal divided into a plurality of subsignals comprising:

coding means for coding subsignals so as to produce a stream of coded subsignals; and indexing means for indexing the coded subsignal by an item of information if at least the decoding of one coded subsignal by at least two different techniques is acceptable.

The invention also proposes an apparatus for decoding a coded digital signal, this coded signal resulting from an original digital signal decomposed into a plurality of subsignals, the subsignals being coded by means of a coding technique among a plurality of coding techniques, the apparatus comprising:

applying means for applying a plurality of decoding techniques to a coded subsignal; and reading means for reading, from the stream of coded subsignals, an item of information making it possible to select a decoding technique among decoding techniques if at least two decoding techniques are acceptable.

The invention also proposes a memory medium for storing a program to be executed in a digital signal coding apparatus, said program comprising:

code for choosing a coding technique to code a plurality of subsignals obtained by dividing the digital signal among a plurality of coding techniques, so as to produce a stream of coded sugsignals, code for checking if the decoding of coded subsignals by at least two different decoding techniques associated to the coding techniques is acceptable, and code for inserting an item of information in the stream of coded subsignals making it possible to select, during decoding, a decoding technique associated with a coding technique used for coding said subsignal if at least the decoding of one coded subsignal by at least two different techniques is acceptable.

The invention also proposes a memory medium for storing a program to be executed in a digital signal decoding apparatus for decoding a coded digital signal, the coded digital signal resulting from an original digital signal decomposed into a plurality of subsignals, at least one subsignal being coded by means of a coding technique among a plurality of coding techniques, said program comprising:

code for applying a plurality of decoding techniques to at least one coded subsignal, and code for reading in the stream of coded subsignals an item of information making it possible to select a decoding technique among decoding techniques if at least two decoding techniques are acceptable for at least one coded subsignal.

The invention also proposes a program stored in a memory medium in a digital signal coding apparatus, said program comprising:

code for choosing a coding technique to code a plurality of subsignals obtained by dividing the digital signal among a plurality of coding techniques, so as to produce a stream of coded subsignals, code for checking if the decoding of coded subsignals by at least two different decoding techniques associated to the coding techniques is acceptable, and code for inserting an item of information in the stream of coded subsignals making it possible to select, during decoding, a decoding technique associated with a coding technique used for coding said subsignal if at least the decoding of one coded subsignal by at least two different techniques is acceptable.

The invention also proposes a program stored in a memory medium in a digital signal decoding apparatus for decoding a coded digital signal, the coded digital resulting from an original digital signal decomposed into a plurality of subsignals, at least one subsignal being coded by means of a coding technique among a plurality of coding techniques, said program comprising:

code for applying a plurality of decoding techniques to at least one coded subsignal, and code for reading in the stream of coded subsignals an item of information making it possible to select a decoding technique among decoding techniques if at least two decoding techniques are acceptable for at least one coded subsignal.

The invention also proposes an apparatus for coding a digital signal comprising:

a processor for dividing the signal into a plurality of subsignals, for choosing a coding technique to code the subsignals among a plurality of coding techniques, so as to produce a stream of coded subsignals, for checking if the decoding of coded subsignals by at least two different decoding techniques associated to the coding techniques is acceptable; and for inserting an item of information in the stream of coded subsignals making it possible to select, during decoding, a decoding technique associated with a coding technique used for coding said subsignal if at least the decoding of one coded subsignal by at least two different techniques is acceptable.

The invention also proposes an apparatus for decoding a coded digital signal, the coded digital signal resulting from an original digital signal decomposed into a plurality of subsignals, at least one subsignal being coded by means of a coding technique among a plurality of coding techniques, the apparatus comprising:

a processor for applying a plurality of decoding techniques to at least one coded subsignal, and for reading in the stream of coded subsignals an item of information making it possible to select a decoding technique among decoding techniques if at least two decoding techniques are acceptable for at least one coded subsignal.

The invention applies in particular to the coding and decoding of signals representing images. It may be either black and white images or colour images.

The particular characteristics and the advantages of the coding device, of the decoding method and device, of the digital signal processing apparatus and the information storage means being the same as those of the coding method of the invention, they are not repeated here.

Other aspects and advantages of the invention will emerge from a reading of the following detailed description of particular embodiments, given by way of non-limitative examples. The description refers to the drawings which accompany it, in which.

Figure 1:
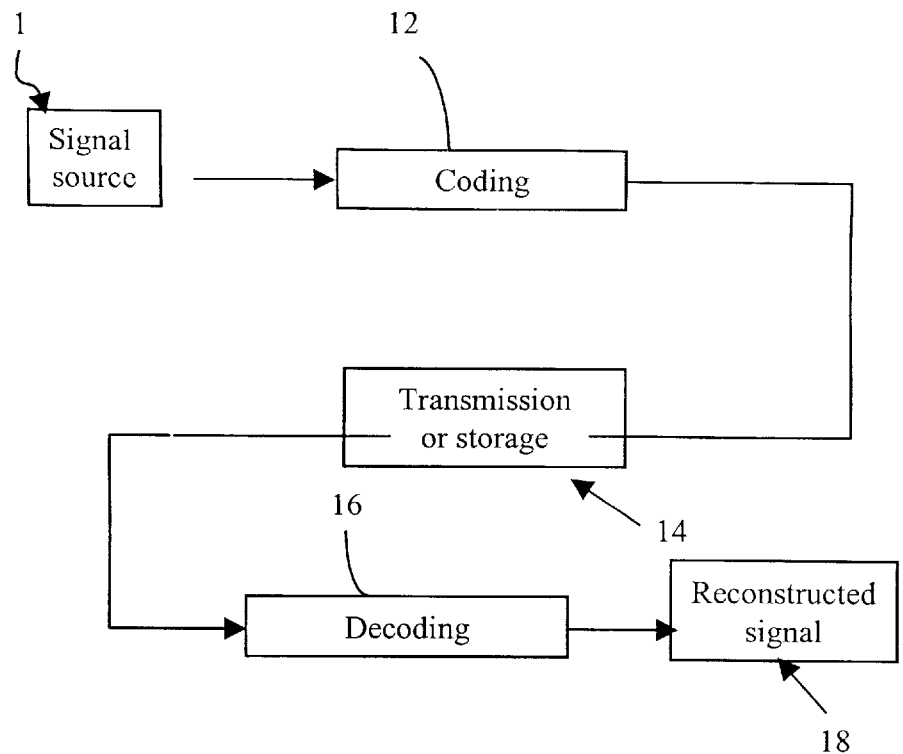
FIG. 1 illustrates schematically the context of the coding and decoding methods and devices of the invention.

As shown in FIG. 1, a digital signal source 1 is considered, producing either an image signal or a video signal, or a sound signal, or a data signal.

The signal issuing from this digital signal source (block 12 in FIG. 1) is to be coded, with a view to transmitting or storing this signal in compressed form (reference 14 in FIG. 1).

In order to reconstitute the original signal (reconstructed signal 18 in FIG. 1), it is necessary to decode (block 16) the coded signal transmitted or stored, the decoding operation necessarily being the transformation which is the reverse of the coding operation so that the signal is correctly reconstructed.

Figure 2:
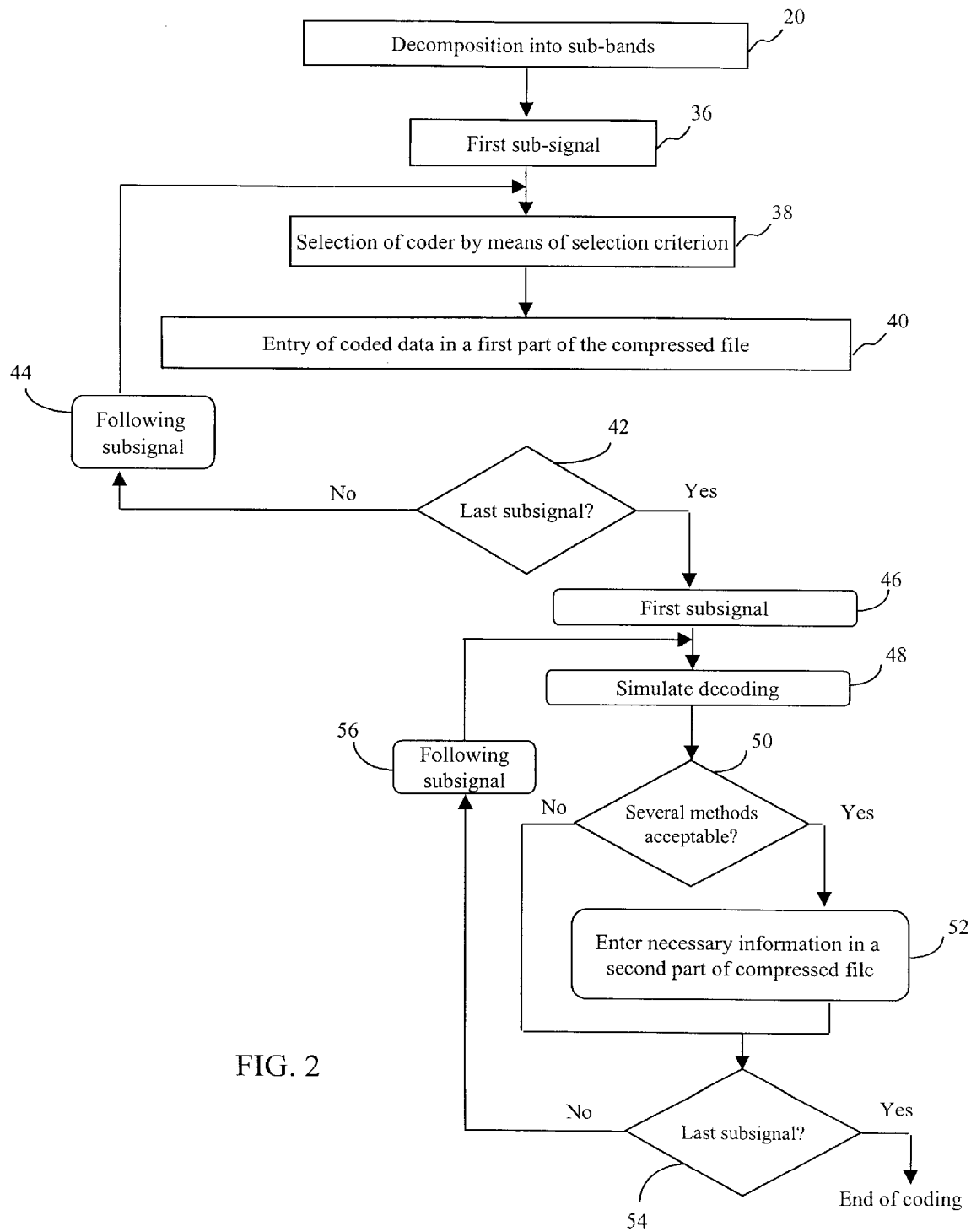
FIG. 2 is a flow diagram illustrating successive steps of the coding method of the invention, in a particular embodiment.

FIG. 2 presents the succession of steps performed in the context of the coding method of the invention, in a particular embodiment.

During a step 20, first of all the digital signal to be coded is decomposed into a plurality of subsignals. By way of non-limitative example, the digital signal can be decomposed into several frequency sub-bands, by means of a conventional technique of decomposition into sub-bands, and then these sub-bands can be divided into blocks constituting the aforementioned subsignals, these blocks corresponding respectively to the frequency sub-bands.

Figure 3:
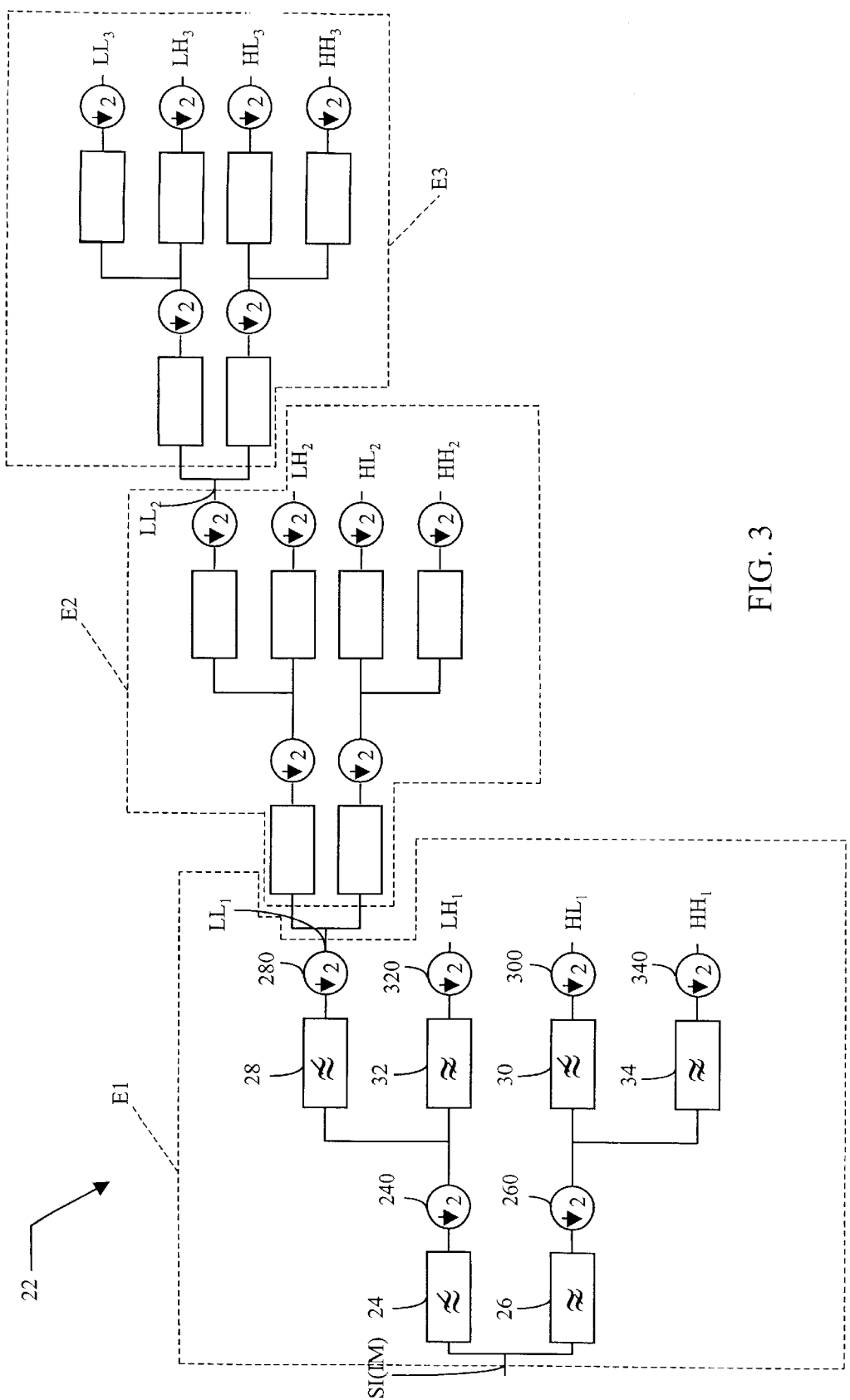
FIG. 3 is a schematic representation of a circuit for decomposing into frequency sub-bands, adapted to execute a step of decomposing the digital signal into sub-bands according to the coding method of the invention, in a particular embodiment.

By way of example which is in no way limitative, FIG. 3 depicts a circuit 22 for decomposing into sub-bands making it possible to execute step 20, in the more particular application of the coding method to a signal Si representing a digital image IM. The image signal, denoted SI(IM), is a series of digital words, for example bytes. Each byte value represents a pixel of the image IM, which is for example an image with 256 grey levels, or black and white image.

The circuit for decomposing into sub-bands 22, or analysis circuit, is a conventional set of filters, respectively associated with decimators by two, which filter the image signal in two directions, into sub-bands of high and low spatial frequencies. According to FIG. 2, the circuit 22 includes three successive analysis stages E1, E2, E3 for decomposing the image IM into sub-bands according to three resolution levels.

In general terms, the resolution is a signal of the number of samples per unit length used for representing this signal. In the case of an image signal, the resolution of a sub-band is related to the number of samples per unit length used for representing this sub-band. The resolution depends on the number of decimations performed.

The first analysis stage E1 receives the digital image signal and applies it to two digital filters, respectively low pass and high pass 24 and 26, which filter the image signal in a first direction, for example horizontal. After passing through decimators by two 240 and 260, the resulting filtered signals are respectively applied to two low-pass filters 28 and 30, and high-pass filters 32 and 34, which filter them in a second direction, for example vertical. Each resulting filtered signal passes through a respective decimator by two 280, 300, 320, 340. The first analysis stage E1 delivers at its output four sub-bands $LL_1$, $LH_1$, $HL_1$, and $HH_1$ with the highest resolution $RES_1$ in the decomposition. The sub-band $LL_1$ includes the components, or coefficients, of low frequency, in both directions, of the image signal. The sub-band $LH_1$ includes the components of low frequency in the first direction and the components of high frequency in the second direction. The sub-band $HL_1$ includes the components of high frequency in the first direction and the components of low frequency in the second direction. The sub-band $HH_1$ includes the components of high frequency in both directions.

Each sub-band is an image constructed from the original image, which contains information corresponding to a respectively vertical, horizontal and diagonal orientation of the contours of the image, in a given frequency band.

The sub-band $LL_1$ is analysed by a second analysis stage E2 which is similar to the stage E1, in order to supply four sub-bands $LL_2$, $LH_2$, $HL_2$, $HH_2$ with a resolution level $RES_2$ intermediate in the decomposition. The sub-band $LL_2$ includes the components of low-frequency in the two analysis directions, and is in its turn analysed by a third analysis stage E3 similar to the two previous ones. The third analysis stage E3 supplies sub-bands $LL_3$, $LH_3$, $HL_3$ and $HH_3$ with the lowest resolution $RES_3$ in the decomposition, resulting from the division of the sub-band $LL_2$ into sub-bands.

Each of the sub-bands of resolution $RES_2$ and $RES_3$ also corresponds to an orientation in the image.

The decomposition effected by the circuit 22 is such that a sub-band of a given resolution is divided into four sub-bands of lower resolution and therefore has four times more coefficients than each of the sub-bands with lower resolution.

Naturally, the number of resolution levels and the number of sub-bands per resolution level, can be chosen differently.

As shown in FIG. 2, the step 20 of decomposing the original digital signal into sub-bands is followed by a step 36 consisting of considering a first subsignal issuing from the decomposition into blocks of a sub-band.

At step 38, a coding technique is chosen amongst a predetermined number M of coding techniques $C_i$, i being an integer between 1 and M, for coding the subsignal under consideration. This choice is made as a function of a predetermined selection criterion. The coding techniques available can comprise for example a coding by vector quantisation and a coding by discrete cosine transformation (DCT).

For this purpose, the following procedure is followed. The subsignal under consideration is coded by means of all the coding techniques Ci, so as to obtain M coded subsignals. Then the coded subsignals are compared in order to select the most appropriate coding technique.

In order to make this comparison, there are calculated, for example, on the one hand the M transmission rates necessary for transmitting respectively the M coded subsignals and on the other hand the coding errors, or distortion, caused by each coding technique. If the original digital signal is an image signal, the coding errors measure respectively the root mean square error caused in the reconstructed image by the coding of the subsignal under consideration, according to each of the coding techniques.

There are next compared, by way of limitative example, the weighted sums R+λ.D, R designating the transmission rate, D designating the distortion and λ being an adjustment coefficient, obtained for each of the coded subsignals.

Then the coding technique for which the value of this weighted sum is the lowest is selected for the subsignal under consideration.

At step 40, the coded signal thus obtained is entered in a first part of a file, which is intended to receive the coded digital signal.

Steps 42 and 44 illustrate the fact that the same procedure is followed with all the subsignals forming the blocks issuing from the decomposition into sub-bands of the original digital signal.

Steps 20, 36, 38, 40, 42 and 44, which have just been described, illustrate the first phase of the coding method, which is the coding phase proper. Below the second phase of the coding method is described, which is a verification phase.

In general terms, this verification phase is a phase preparatory to the decoding, which consists of simulating the decoding in order to eliminate any ambiguities in the choice of a decoding technique amongst several possibilities, for a given coded subsignal.

It should be noted that, in the absence of this verification phase, the probability of error during decoding greatly increases, given that a decoding technique not corresponding to the coding technique initially used may be chosen by error. This is why it is particularly advantageous to carry out this decoding simulation phase.

At step 46, a first coded subsignal is extracted from the file containing the coded digital signal. At step 48, M decoding techniques Di respectively associated with the M coding techniques Ci used for coding the subsignal under consideration are successively applied to this coded subsignal.

Several cases may arise during the attempt to decoding the coded subsignal by means of any decoding technique Di:

(i) either the code read cannot be decoded by Di, that is to say it is impossible for the coding technique Ci to have initially generated the subsignal obtained after decoding. For example, the subsignal "decoded" by Di contains symbols or series of binary symbols which do not belong to the family of binary symbols able to have been generated by the coding technique Ci. In this case, the decoding technique Di is eliminated, that is to say it is not considered to be acceptable;

(ii) or the code can be decoded by Di but the "decoded" data are impossible. For example, the data generated have a dynamic range greater than the dynamic range of the original subsignal. In this case, as in situation (i), the decoding technique Di is not considered to be acceptable;

(iii) or the code can be decoded by Di and the data generated are possible, but they are unlikely, within the meaning of a predetermined likelihood criterion. This likelihood criterion takes into account for example the context of the subsignals whose decoding has already been simulated, and consists of calculating the value of the distortion between the subsignal whose decoding is currently being simulated and adjacent subsignals and comparing it with a threshold fixed in advance. If the value of the distortion is strictly greater than this threshold, the "decoded" subsignal is considered to be not likely, and the decoding technique Di is not considered to be acceptable, whilst if the value of the distortion is less than or equal to this threshold, the subsignal obtained after application of Di is considered to be likely and the decoding technique Di is considered to be acceptable;

(iv) or the code can be decoded by Di and the decoded data are possible and likely. In this case, the decoding technique Di is said to be acceptable.

The following step of the coding method (reference 50 in FIG. 2) consists of testing whether, at the end of the previous simulation step, several decoding techniques have been considered to be acceptable.

According to the present invention, it is if and only if at least two decoding techniques have been considered to be acceptable that a writing step 52 is performed, to which there is entered, in a second part of the file containing the coded digital signal in its first part, an item of information which will enable the decoder to apply the correct decoding technique to the subsignal under consideration.

The information which is entered is for example a binary word representing a number associated bijectively with a coding technique Ci. For example, if M=2 coding techniques C1 and C2 are used, it suffices to enter a it which, by convention, takes the value "0" if coding technique C1 is used and he value "1" if coding technique C2 is used.

In FIG. 2, steps 54 and 56 illustrate the fact that the same procedure is followed with all the subsignals.

A particular embodiment of the decoding method of the invention will now be described with the help of FIG. 4.

The decoding system first of all receives (step 58) the coded digital signal contained in the first part of the file mentioned above, subsignal by subsignal.

The following steps performed during decoding and consisting of determining the acceptable decoding technique or techniques (references 60 and 62 of FIG. 4) are identical respectively to steps 46 to 48 performed at the time of coding during the phase of simulating the decoding. These steps will therefore not be described again here.

Given that the process of determining the acceptable decoding techniques unfold in an identical fashion during coding and decoding, when several acceptable decoding techniques are detected during decoding, there necessarily exists an item of information, entered during coding, during the decoding simulation phase, in the second part of the file containing the coded digital signal, this information making it possible to select the single decoding technique Di which corresponds to the coding technique Ci initially used for coding the subsignal under consideration.

At step 64, in this case, this information is read, and then the appropriate decoding technique is derived therefrom (step 66), and the current subsignal is decoded (step 68).

Steps 70 and 72 illustrate the fact that the same procedure is followed for decoding all the coded subsignals.

An example of the evaluation of the likelihood of a decoded subsignal is described below with the help of FIG.

5, in the case where the original digital signal is a digital image signal. This evaluation can take place either during decoding or during coding, during the decoding simulation phase.

The original image is divided, as explained above, into frequency sub-bands, and each sub-band is coded independently. Each sub-band is here divided into square blocks of 4×4 coefficients. As a variant, the blocks can have any other form of region, not necessarily square or rectangular.

X and Z designate two blocks which have already been decoded (or respectively whose decoding has already been simulated) and which are adjacent, each through a boundary, with a block Y currently being decoded (or respectively in the course of decoding simulation).

The likelihood criterion chosen in this example consists of calculating the value of the distortion along the boundary common to the block Y and to two of its adjacent blocks, blocks X and Z.

Figure 5:
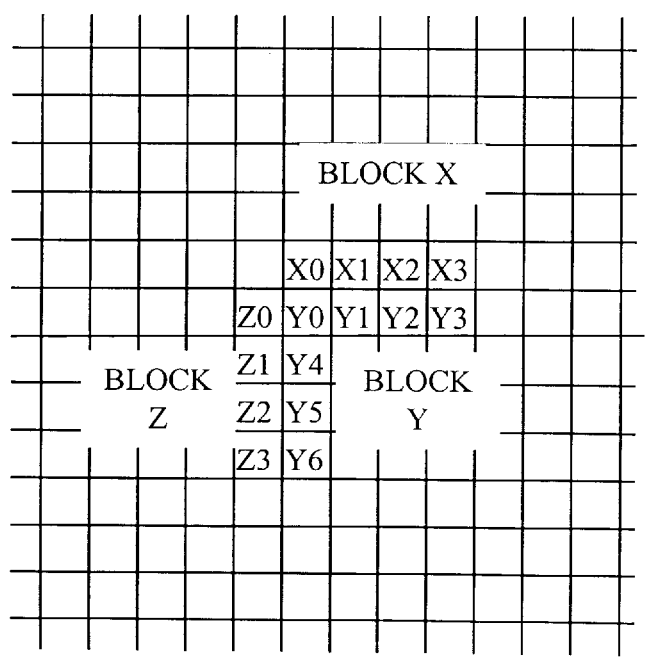
FIG. 5 depicts schematically several subsignals issuing from a digital image signal, in the form of blocks of 4×4 coefficients.

This distortion is evaluated by means of the root mean square error between the boundary vectors illustrated in FIG. 5, namely the vector already decoded (or respectively whose decoding has already been simulated) (Z3, Z2, Z1, Z0, X0, X1, X2, X3), and the vector in the course of decoding (or respectively in the course of decoding simulation) (Y6, Y5, Y4, Y0, Y0, Y1, Y2, Y3).

If the value of the distortion thus obtained is greater than a given threshold, the block Y is considered to be unlikely; otherwise, the block Y is considered to be likely.

Figure 6:
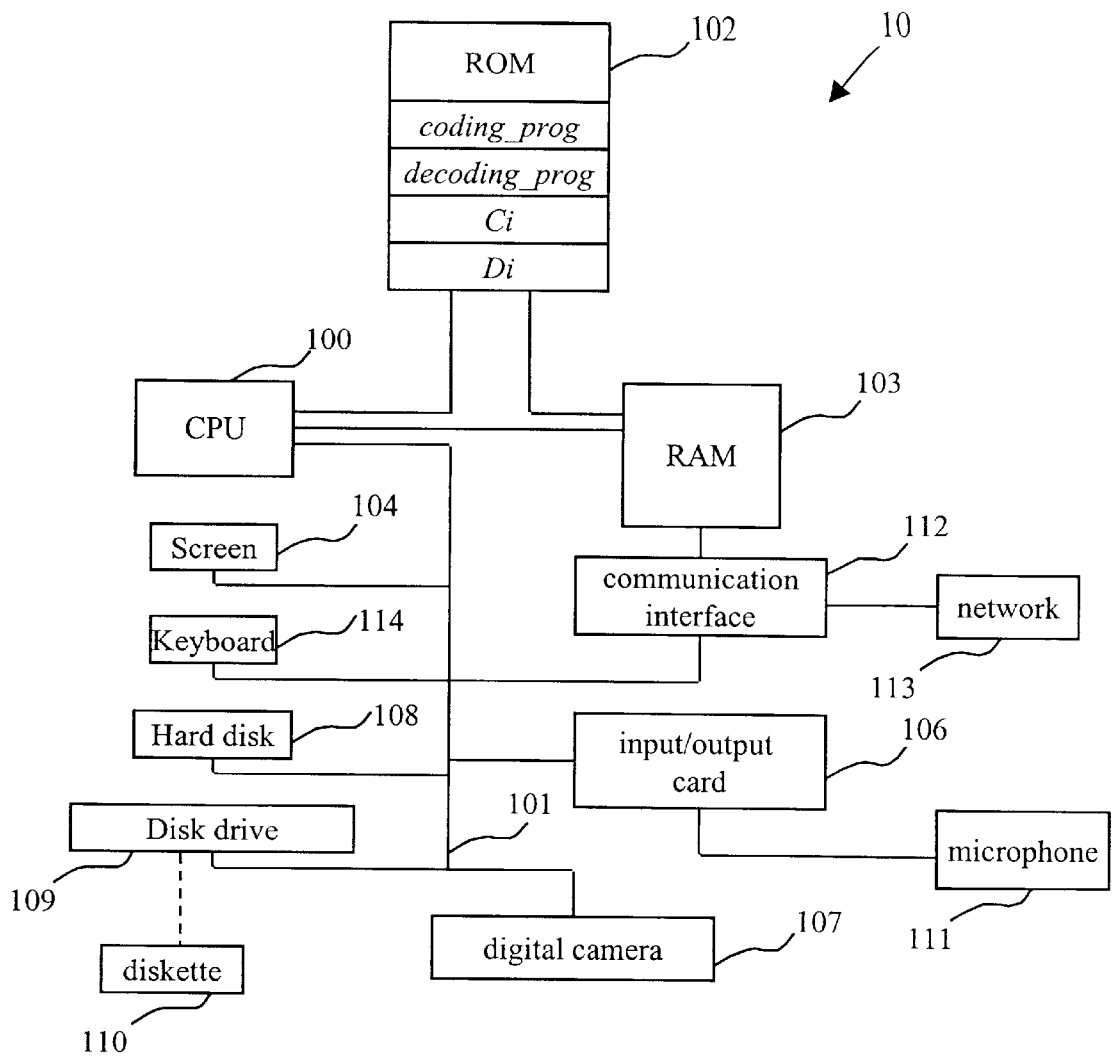
FIG. 6 depicts schematically a particular embodiment of a system able to contain all or part of a coding device according to the invention and all or part of a decoding device according to the invention.

The system 10 depicted schematically in FIG. 6 may, as described below, is able to contain all the coding device of the present invention or only part thereof, and/or the whole of the decoding device of the present invention or only part thereof.

This system 10 can for example be a microcomputer, connected to different peripherals such as a digital camera 107, or a scanner, or any means of entering and storing images. The camera 107 is for example connected to a graphics card and supplies data to be compressed and therefore to be coded.

The system 10 has a communication interface 112 connected to a network 113, which is able both to transmit to the system 10 data to be compressed coming from the outside, and to transmit to other points in this network 1 13 compressed data coming from the system 10.

The system 10 also has a storage means 108, such as a hard disk, for example. The system 10 also has a disk drive 109, which is designed to receive diskettes 110. As a variant, the disk drive 109 and the diskettes 110 can be replaced respectively by a fixed-memory compact disc player (CD-ROM) and fixed-memory compact discs, or by a memory card reader and memory cards, or by a digital video disc player (DVD). The diskettes, fixed-memory compact discs, memory cards or digital video discs 110 and the hard disk 108 can contain data coded according to the coding method described above, and can also contain programs for executing the successive steps of the coding method and/or of the decoding method described above.

According to a first variant, the programs enabling the system 10 to implement the coding method and decoding method of the invention can be stored in a read only memory 102.

According to a second variant, the aforementioned programs can be received from the network 113 by means of the communication interface 112.

When the data to be compressed consists of audio signals, the system 10 is connected to an external microphone 111, by means of an input/output card 106.

The system 10 possibly also includes a screen 104 and/or a keyboard 114. The screen 104 can make it possible to display the data to be compressed and/or serve as an interface with a user of the system 10. This user can for example be given the possibility of choosing between several coding techniques, entering this choice by means of the keyboard.

A central processing unit 100 included in the system 10 and connected, for example by means of a communication bus 101, to the elements 102 to 104, 106 to 109, 112 and 114 described previously, executes the instructions stored in the read only memory 102 or in the other storage elements relating to the steps of the coding and/or decoding method described previously.

Figure 4:
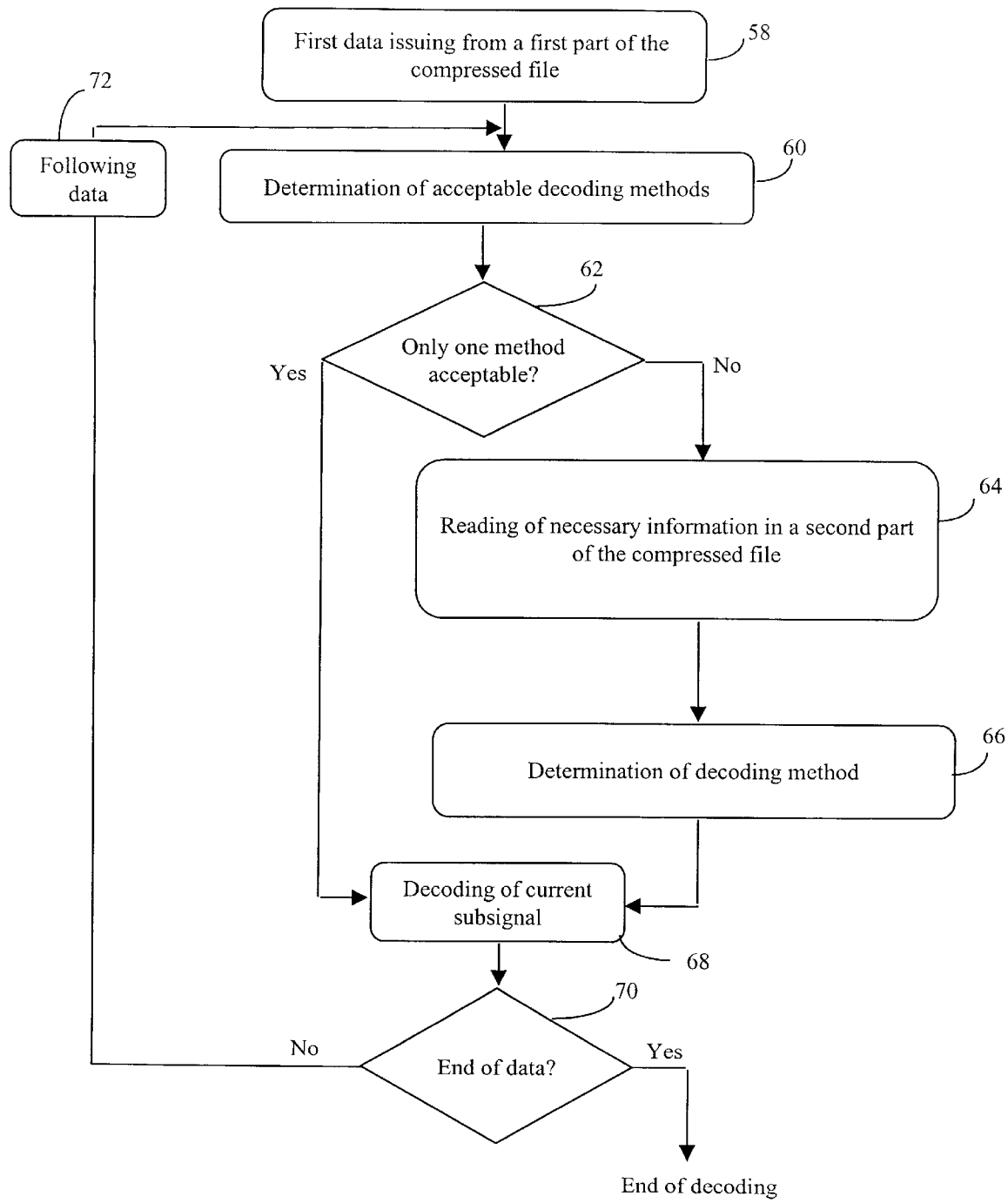
FIG. 4 is a flow diagram illustrating successive steps of the decoding method of the invention, in a particular embodiment.

Thus the central processing unit 100 is adapted to implement the low diagrams described in FIGS. 2 and 4.

The central processing unit 100, the read only memory 102 and the random access memory 103 can cooperate in order to form:

means of decomposing the digital signal into several subsignals;

means of selecting a coding technique amongst M coding techniques Ci, which produce, from the subsignals supplied by the decomposition means, a stream of coded bits;

means of writing the stream of coded bits into a first part of a file intended to receive the coded digital signal;

means of simulating the decoding which produce, from each coded subsignal, M subsignals decoded respectively by applying the M decoding techniques Di corresponding to the M coding techniques Ci; and means of writing information in a second part of the file containing the coded digital signal, this information relating to the coding technique Ci used for coding a given subsignal.

The information writing means are controlled by the decoding simulation means, so as to enter only in certain cases, in the second part of the file, the information making it possible to select, during decoding, the decoding technique corresponding to the coding technique actually used for coding the subsignal currently being decoded. This is because the information writing means enter such information only if the decoding simulation means indicate that several decoding techniques are acceptable for decoding the same subsignal.

Thus the signal 10 can comprise a device for coding digital signals implementing a coding method as described above.

In addition, the central processing unit 100, the read only memory 102 and the random access memory 103 can cooperate in order to form:

means of successively applying M decoding techniques Di to a given coded subsignal, which produce M "decoded" subsignals for each coded subsignal; and means of reading, in a second part of the file containing the coded digital signal, information for selecting the correct decoding technique amongst several acceptable decoding techniques.

The means of successively applying the M decoding techniques evaluate the likelihood of each "decoded" subsignal and control the reading means so that the latter read the information which makes it possible to select the correct decoding technique only where several decoding techniques have been considered to be acceptable for decoding one and the same subsignal at the end of the evaluation of the likelihood of the M "decoded" subsignals.

Thus the system 10 can comprise a digital signal decoding device implementing a decoding method as described above.

According to a first variant embodiment, when the system 10 is powered up, the coding and/or decoding programs and techniques stored in one of the non-volatile memories, for example the read only memory 102, are transferred into a random access memory 103 of the system 10, which then contains the executable code and the variables necessary to the implementation of the coding and/or decoding methods of the invention.

According to a second variant embodiment, the different coding and/or decoding techniques liable to used can be stored in storage elements different from those which store the executable code. In fact the invention can be improved by introducing, into the system 10, additional coding and decoding techniques, either by means of the network 113, via the communication interface 112, or by means of a diskette or similar data medium 110.

The communication bus 101 allows communication between the different entities included in the system 10, or connected thereto, such as the digital camera 107. However, the representation of the bus 101 proposed in FIG. 6 is in no way limitative. In particular, the central processing unit 100 is able to communicate instructions to any entity included in the system 10, either directly, or by means of another entity of the system 10.

What is claimed is:

1. Method of coding a digital signal comprising the steps of:
    dividing the signal into a plurality of subsignals,
    choosing a coding technique to code the subsignals among a plurality of coding techniques, so as to produce a stream of coded subsignals,
    checking if the decoding of coded subsignals by at least two different decoding techniques associated to the coding techniques is acceptable, and
    if at least the decoding of one coded subsignal by at least two different techniques is acceptable, inserting an item of information in the stream of coded subsignals making it possible to select, during decoding, a decoding technique associated with the coding technique used for coding said subsignal.

2. Coding method according to claim 1, wherein the digital signal is divided into a plurality of frequency sub-bands, themselves divided into blocks constituting said subsignals corresponding respectively to said plurality of frequency sub-bands.

3. Coding method according to claim 1 or 2, wherein the checking step a likelihood criterion is used for checking if the decoding of coded subsignals by at least two different decoding techniques associated to the coding techniques is acceptable.

4. Coding method according to claim 3, wherein the likelihood criterion consists of:
    comparing the value of the distortion between a decoded digital signal and adjacent subsignals with a predetermined threshold, and
    deciding that the decode subsignal is likely if the value of the distortion is less than or equal to said threshold, or
    deciding that the decoded subsignal is not likely if the value of the distortion is strictly greater than said threshold.

5. Coding method according to claim 4, in which the digital signal is an image and each subsignal is a block of coefficients, wherein the value of the distortion is calculated from the root mean square error between two vectors of coefficients located along the boundary of one or more blocks.

6. Digital signal coding apparatus comprising:
    dividing means for dividing the signal into a plurality of subsignals,
    choosing means for choosing a coding technique to code subsignals among a plurality of coding techniques, so as to produce a stream of coded subsignals,
    checking means for checking if the decoding of coded subsignals by at least two different decoding techniques associated to the coding techniques is acceptable, and
    if at least the decoding of one coded subsignal by at least two different techniques is acceptable, inserting means for inserting an item of information in the stream of coded subsignals making if possible to select, during decoding, a decoding technique associated with a coding technique used for coding said subsignal.

7. Digital signal coding apparatus according to claim 6, wherein the dividing means for dividing the digital signal include means for dividing the digital signal into a plurality of frequency sub-bands, themselves divided into blocks constituting said subsignals corresponding respectively to said plurality of frequency sub-bands.

8. Digital signal coding apparatus according to claim 6 or 7, wherein said checking means checks if the decoding of coded subsignals by at least two different decoding techniques associated to the coding techniques is acceptable by using a likelihood criterion.

9. Digital signal coding apparatus according to claim 8, wherein the likelihood criterion consists of:
    comparing the value of the distortion between a decoded digital signal and adjacent subsignals with a predetermined threshold, and
    deciding that the decoded subsignal is likely if the value of the distortion is less than or equal to said threshold, or
    deciding that the decoded subsignal is not likely if the value of the distortion is strictly greater than said threshold.

10. Digital signal coding apparatus according to claim 9, in which the digital signal is an image and each subsignal is a block of coefficients, wherein the value of the distortion is calculated from the root mean square error between two vectors of coefficients located along the boundary of one or more blocks.

11. Method of decoding a coded digital signal, the coded digital signal resulting from an original digital signal decomposed into a plurality of subsignals, at least one subsignal being coded by means of a coding technique among a plurality of coding techniques, the method comprising the steps of:
    applying a plurality of decoding techniques to at least one coded subsignal, and
    if at least two decoding techniques are acceptable for at least one coded subsignal, reading in the stream of coded subsignals an item of information making it possible to select a decoding technique among the decoding techniques.

12. Decoding method according to claim 11, further comprising a checking step for checking if at least two decoding techniques are acceptable for at least one coded subsignal, and wherein in the checking step a likelihood criterion is used.

13. Decoding method according to claim 12, wherein the likelihood criterion consists of:
    comparing the value of the distortion between a decoded digital signal and adjacent subsignals with a predetermined threshold, and deciding that the decoded subsignal is likely if the value of the distortion is less than or equal to said threshold, or deciding that the decoded subsignal is not likely if the value of the distortion is strictly greater than said threshold.

14. Decoding method according to claim 13, in which the digital signal is an image and each subsignal is a block of coefficients, wherein the value of the distortion is calculated from the root mean square error between two vectors of coefficients located along the boundary of one or more blocks.

15. Apparatus for decoding a coded digital signal, the coded digital signal resulting from an original digital signal decomposed into a plurality of subsignals, at least one subsignal being coded by means of a coding technique among a plurality of coding techniques, the apparatus comprising:

applying means for applying a plurality of decoding techniques to at least one coded subsignal, and reading means for reading in the stream of coded subsignals an item of information making it possible to select a decoding technique among decoding techniques if at least two decoding techniques are acceptable for at least one coded subsignal.

16. Apparatus for decoding according to claim 15, further comprising checking means for checking if at least two decoding techniques are acceptable for at least one coded subsignal, and wherein said checking means checks within the meaning of a likelihood criterion.

17. Apparatus for decoding according to claim 16, wherein the likelihood criterion consists of:

comparing the value of the distortion between a decoded digital signal and adjacent subsignals with a predetermined threshold, and deciding that the decoded subsignal is likely if the value of the distortion is less than or equal to said threshold, or deciding that the decoded subsignal is not likely if the value of the distortion is strictly greater than said threshold.

18. Apparatus for decoding according to claim 17, in which the digital signal is an image and each subsignal is a block of coefficients, wherein the value of the distortion is calculated from the root mean square error between two vectors of coefficients located along the boundary of one or more blocks.

19. Method of coding a digital signal divided into a plurality of subsignals comprising the steps of:

coding subsignals so as to produce a stream of coded subsignals, and for at least one coded subsignal, if the coded subsignal can be decoded within the meaning of a predetermined likelihood criterion, setting a predetermined value on an item of information for the coded subsignal an indexing the coded subsignals by the items of informations for the coded subsignals.

20. A method of coding according to claim 19, further comprising a step of checking if subsignals can be decoded within the meaning of a predetermined likelihood criterion.

21. A method according to claim 20, wherein said checking step includes a step of decoding subsignals.

22. A method according to claim 21, wherein said checking step includes a step for checking a dynamic range of the decoded subsignals.

23. A method according to claim 22, wherein said checking step includes a step for checking a value of distortion between adjacent subsignals.

24. A method according to claim 23, wherein said indexing is executed for each of the coded digital data corresponding to the subsignal.

25. Method of decoding a stream comprising coded subsignals and items of informations, the method comprising the steps of:

reading items of informations relating to the decoding from the stream, the items of informations being set within the meaning of a predetermined likelihood criterion, and decoding subsignals according to the items of informations read in said reading step.

26. A method according to claim 25, wherein the likelihood criterion relates to distortion between adjacent subsignals.

27. Method of coding a digital signal divided into a plurality of subsignals comprising the steps of:

coding subsignals so as to produce a stream of coded subsignals; and if at least the decoding of one coded subsignal by at least two different techniques is acceptable, indexing said coded subsignal by an item of information.

28. Method of decoding a coded digital signal, the coded signal resulting from an original digital signal decomposed into a plurality of subsignals, the subsignals being coded by means of a coding technique among a plurality of coding techniques, the method comprising the steps of:

applying a plurality of decoding techniques to a coded subsignal, and if at least two decoding techniques are acceptable, reading an item of information making it possible to select a decoding technique among decoding techniques from the stream of coded signals.

29. Apparatus for coding a digital signal divided into a plurality of subsignals comprising:

coding means for coding subsignals so as to produce a stream of coded subsignals; and indexing means for setting to a predetermined value an item of information for a coded subsignal if the coded subsignal can be decoded within the meaning of a predetermined likelihood criterion and for indexing the coded subsignals by the items of informations for the coded subsignals.

30. Apparatus for decoding a stream comprising coded subsignals and items of informations comprising:

reading means for reading items of informations relating to the decoding from the stream of coded subsignals, the items being set within the meaning of a predetermined likelihood criterion; and decoding means for decoding subsignals according to items of informations read by said reading means.

31. Apparatus for coding a digital signal divided into a plurality of subsignals comprising:

coding means for coding subsignals so as to produce a stream of coded subsignals; and indexing means for indexing the coded subsignal by an item of information if at least the decoding of one coded subsignal by at least two different techniques is acceptable.

32. Apparatus for decoding a coded digital signal, this coded signal resulting from an original digital signal decomposed into a plurality of subsignals, the subsignals being coded by means of a coding technique among a plurality of coding techniques, the apparatus comprising:

applying means for applying a plurality of decoding techniques to a coded subsignal; and reading means for reading, from the stream of coded subsignals, an item of information making it possible to select a decoding technique among decoding techniques if at least two decoding techniques are acceptable.

33. A memory medium for storing a program to be executed in a digital signal coding apparatus, said program comprising:

code for choosing a coding technique to code a plurality of subsignals obtained by dividing the digital signal among a plurality of coding techniques, so as to produce a stream of coded sugsignals, code for checking if the decoding of coded subsignals by at least two different decoding techniques associated to the coding techniques is acceptable, and code for inserting an item of information in the stream of coded subsignals making it possible to select, during decoding, a decoding technique associated with a coding technique used for coding said subsignal if at least the decoding of one coded subsignal by at least two different techniques is acceptable.

34. A memory medium for storing a program to be executed in a digital signal decoding apparatus for decoding a coded digital signal, the coded digital signal resulting from an original digital signal decomposed into a plurality of subsignals, at least one subsignal being coded by means of a coding technique among a plurality of coding techniques, said program comprising:

code for applying a plurality of decoding techniques to at least one coded subsignal, and code for reading in the stream of coded subsignals an item of information making it possible to select a decoding technique among decoding techniques if at least two decoding techniques are acceptable for at least one coded subsignal.

35. A program stored in a memory medium in a digital signal coding apparatus, said program comprising:

code for choosing a coding technique to code a plurality of subsignals obtained by dividing the digital signal among a plurality of coding techniques, so as to produce a stream of coded subsignals, code for checking if the decoding of coded subsignals by at least two different decoding techniques associated to the coding techniques is acceptable, and code for inserting an item of information in the stream of coded subsignals making it possible to select, during decoding, a decoding technique associated with a coding technique used for coding said subsignal if at least the decoding of one coded subsignal by at least two different techniques is acceptable.

36. A program stored in a memory medium in a digital signal decoding apparatus for decoding a coded digital signal, the coded digital resulting from an original digital signal decomposed into a plurality of subsignals, at least one subsignal being coded by means of a coding technique among a plurality of coding techniques, said program comprising:

code for applying a plurality of decoding techniques to at least one coded subsignal, and code for reading in the stream of coded subsignals an item of information making it possible to select a decoding technique among decoding techniques if at least two decoding techniques are acceptable for at least one coded subsignal.

37. Apparatus for coding a digital signal comprising:

a processor for dividing the signal into a plurality of subsignals, for choosing a coding technique to code the subsignals among a plurality of coding techniques, so as to produce a stream of coded subsignals, for checking if the decoding of coded subsignals by at least two different decoding techniques associated to the coding techniques is acceptable; and for inserting an item of information in the stream of coded subsignals making it possible to select, during decoding, a decoding technique associated with a coding technique used for coding said subsignal if at least the decoding of one coded subsignal by at least two different techniques is acceptable.

38. Apparatus for decoding a coded digital signal, the coded digital signal resulting from an original digital signal decomposed into a plurality of subsignals, at least one subsignal being coded by means of a coding technique among a plurality of coding techniques, the apparatus comprising:

a processor for applying a plurality of decoding techniques to at least one coded subsignal, and for reading in the stream of coded subsignals an item of information making it possible to select a decoding technique among decoding techniques if at least two decoding techniques are acceptable for at least one coded subsignal.

* * * * *

UNITED STATES PATENT AND TRADEMARK OFFICE
CERTIFICATE OF CORRECTION

PATENT NO. : 6,333,705 B1 Page 1 of 1
DATED : December 25, 2001
INVENTOR(S) : Isabelle Amonou et al.

It is certified that error appears in the above-identified patent and that said Letters Patent is hereby corrected as shown below:

<u>Column 5,</u>
Line 52, "sugsignals," should read -- subsignals, --.

<u>Column 9,</u>
Line 50, "decoding" should read -- decode --.

<u>Column 10,</u>
Line 35, "it" should read -- bit --; and
Line 36, "."0"" should read -- "0" --.

<u>Column 11,</u>
Line 30, "is" should read -- be --.

<u>Column 13,</u>
Line 46, "the" should read -- in the --.

<u>Column 15,</u>
Line 54, "an" should read -- and --.

Signed and Sealed this

Sixteenth Day of July, 2002

Attest:

JAMES E. ROGAN
*Attesting Officer*     *Director of the United States Patent and Trademark Office*